Figure 1:
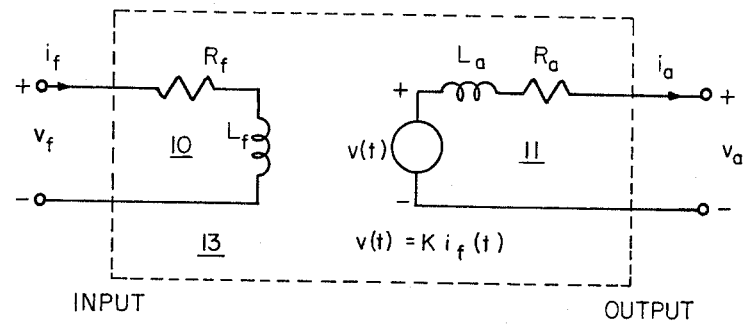

[11] 3,578,998

| [72] | Inventor | William C. Euerle<br>Milton, Mass. |
| [21] | Appl. No. | 773,423 |
| [22] | Filed | Nov. 5, 1968 |
| [45] | Patented | May 18, 1971 |
| [73] | Assignee | Massachusetts Institute of Technology<br>Cambridge, Mass. |

[54] POLYPHASE ALTERNATING CURRENT GENERATOR
8 Claims, 19 Drawing Figs.

[52] U.S. Cl.................................................... 310/11,
307/47, 310/6
[51] Int. Cl..................................................... H02n 4/02
[50] Field of Search.......................................... 310/5, 6,
10, 11, 159, 173; 331/50, 57, 47 (Inquired);
307/18, 19, 20, 11, 47, 57, 84; 321/1, 28, 29

[56] References Cited
UNITED STATES PATENTS

| 2,393,331 | 1/1946 | McWhirter.................. | 331/57X |
| 2,777,067 | 1/1957 | Higby........................... | 331/57 |
| 2,810,843 | 10/1957 | Granqvist..................... | 310/68 |
| 3,047,817 | 7/1962 | Schneider..................... | 331/57 |

*Primary Examiner*—D. X. Sliney
*Attorneys*—Thomas Cooch, Martin M. Santa and Robert Shaw ABSTRACT: A polyphase alternating current electrical power generator is obtained by interconnecting N direct current power generators. N is the number of phases to be generated and must be greater than or equal to three. The output of one generator is connected to the input of another generator either serially through a load or in parallel with a load. For rotating or magnetohydrodynamic generators, the output of one generator is connected to the field winding of another generator in a cascaded connection of generators forming a closed loop. For electrostatic generators the input terminals and output terminals generally have a common ground terminal which restricts the permissible values of N to odd integers. The phasing of the interconnections is such that if the loop is opened at any point, a voltage transfer characteristic corresponding to positive feedback is obtained with a gain of unity and zero phase shift.

Patented May 18, 1971 3,578,998

6 Sheets-Sheet 1

INVENTOR:
WILLIAM C. EUERLE
BY
ATTORNEY

INVENTOR:
WILLIAM C. EUERLE
BY
ATTORNEY

Patented May 18, 1971

3,578,998

6 Sheets-Sheet 4

INVENTOR:
WILLIAM C. EUERLE
BY
ATTORNEY

- ○ SEEDED COMBUSTION GAS, EXPERIMENTAL
- □ ARGON SEEDED WITH CESIUM, THEORETICAL
- △ HELIUM SEEDED WITH LITHIUM, THEORETICAL
- ◇ ARGON SEEDED WITH POTASSIUM, EXPERIMENTAL

INVENTOR:
WILLIAM C. EUERLE

BY
ATTORNEY

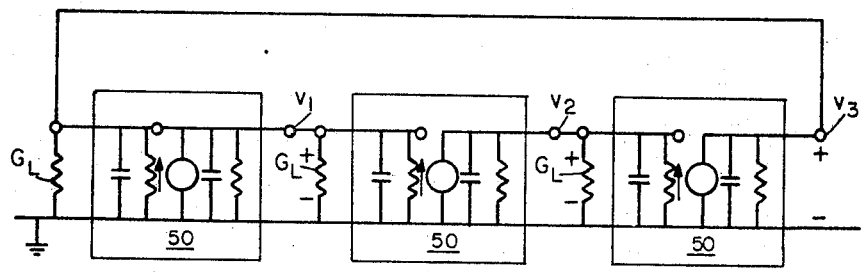
FIG. 15
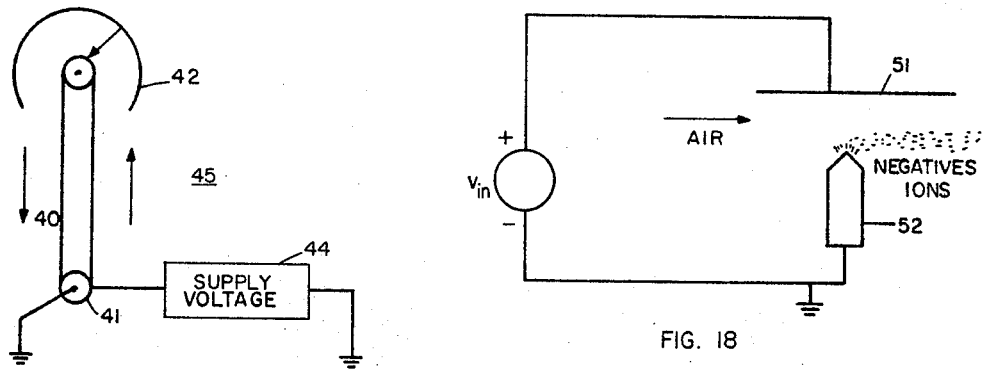
FIG. 16
FIG. 18
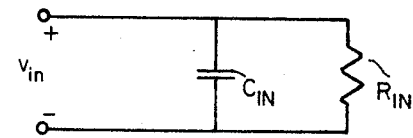
FIG. 19
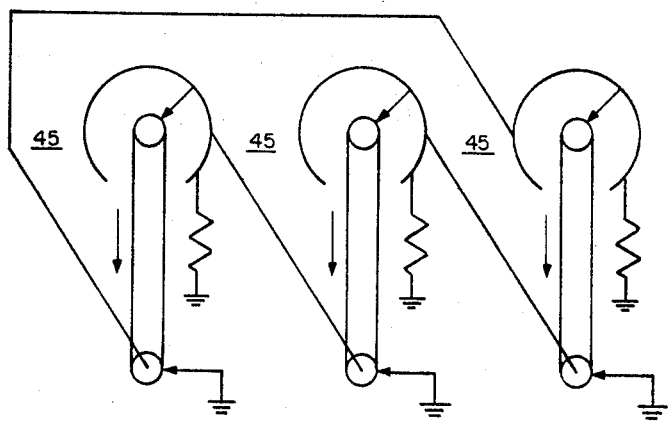
FIG. 17
INVENTOR:
WILLIAM C. EUERLE
BY
ATTORNEY

POLYPHASE ALTERNATING CURRENT GENERATOR The invention relates to apparatus for generating poly phase alternating current electrical power and more particularly to the interconnection of direct current power generators to provide the alternating current power.

The generation of electrical power in the form of alternating current is desirable because of the convenience of transforming the voltage to the desired level. In particular, transmission of power over long distances is desirably at very high voltage in the order of 100,000 or more volts. There is presently under development several types of electrical power sources that transform mechanical power directly into electrical power without the use of machinery that has major moving parts. These power sources are of the magnetohydrodynamic (MHD) type, where electrically conducting gas moves through a region of high magnetic field to generate an output voltage; or of the electrogasdynamic (EHD) type where electric charge is moved to increase its electrical potential. These power sources are fundamentally direct current generators. MHD generators, unfortunately generate power at a level of 10,000 or 20,000 volts. There is no large scale demand for significant amounts of power at this voltage; proposed DC transmission lines will operate at 700,000 volts levels. It appears that any DC power generated will be inverted to AC and transformed to higher voltage for transmission.

The cost of the inversion equipment for a power station would be a significant portion of the total cost, so generation of AC directly, if it could be done without major capital costs, might be more attractive than generation of DC and subsequent inversion.

To get an alternating voltage from an MHD generator with constant gas flow conditions, one must alternate the magnetic field. The energy stored in the magnetic field will be quite large, so there must be some method of storing this energy outside the field during part of each cycle of operation. The field coil driving the magnetic field could, for example, be resonated with a capacitor. This method has been shown to be economically impractical.

One method of alternating the magnetic field using only magnetic energy storage has been disclosed in Pat. No. 3,356,872 to H. Woodson. This involves cross-coupling two or more MHD generators.

This invention presents a different method of cross-coupling MHD generators to produce alternating current power. This method of cross-coupling can also be used for standard rotating DC machines, for EGD generators, for Van de Graaff generators, or for an AC version of Lord Kelvin's "water dropper."

Briefly stated, the invention comprises the cascaded connection of at least three DC generators, the output of one DC generator being connected to the field of another DC generator to form a closed loop. The number of generators in the loop determines the number of phases of the AC thus provided at the output of each DC generator. The frequency of the AC will be determined by the electrical characteristics of each generator. The gain, the electrical transfer characteristic between the input current or voltage of the DC generator and its generated current or voltage, must be such that for stable oscillation of the current or voltage in the loop, the loop gain is unity at a frequency where the phase shift through the loop is zero.

Figure 2:
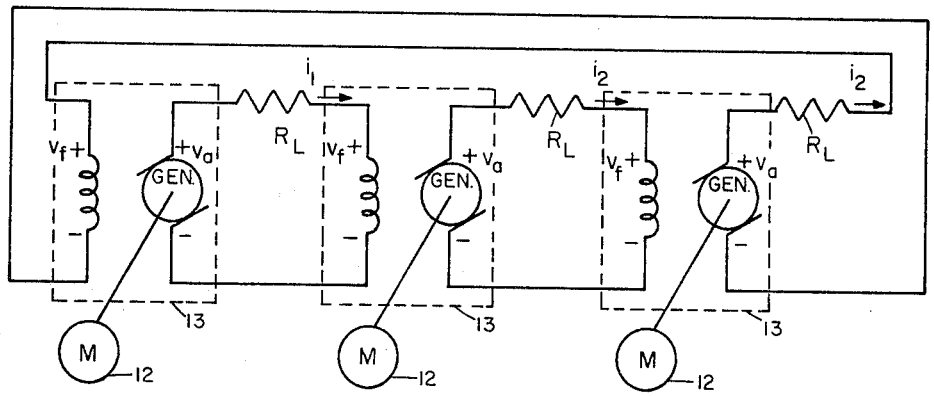
Figure 3:
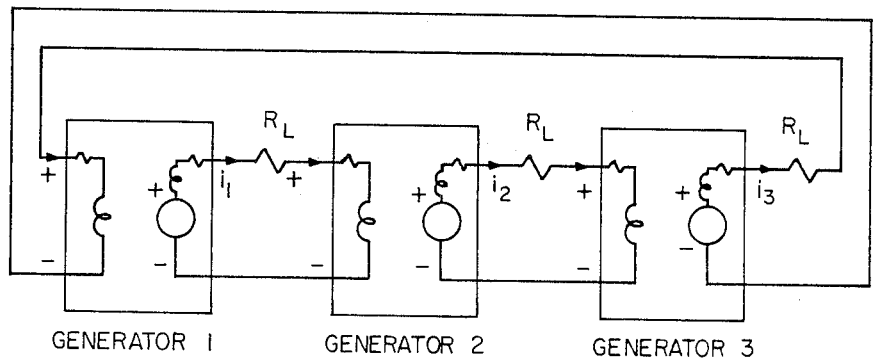
Figure 4:
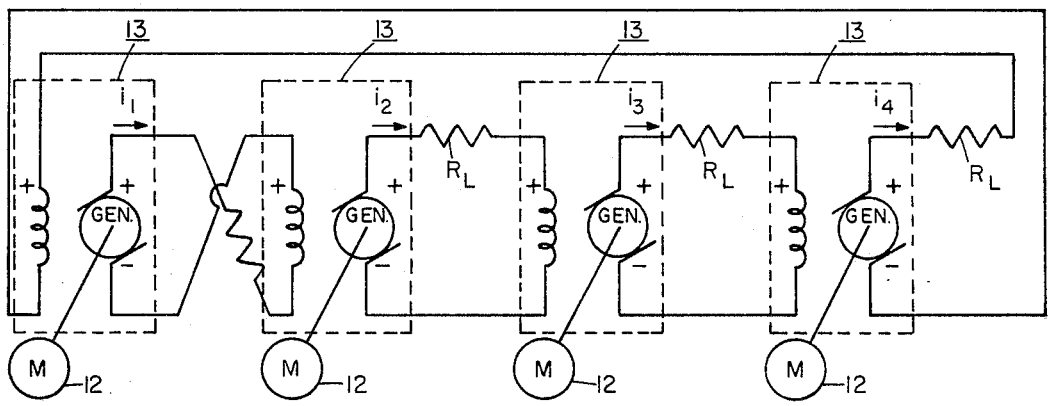
Figure 5:
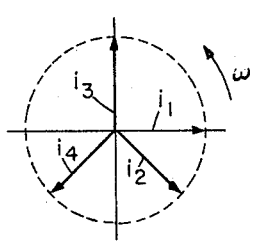
Figure 6:
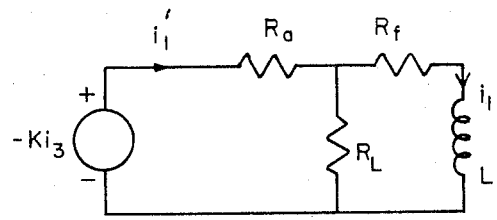
Figure 7:
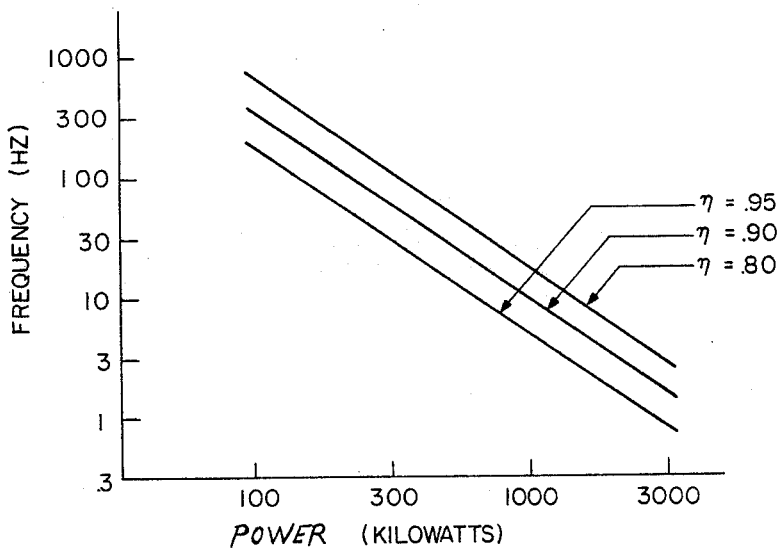
Figure 8:
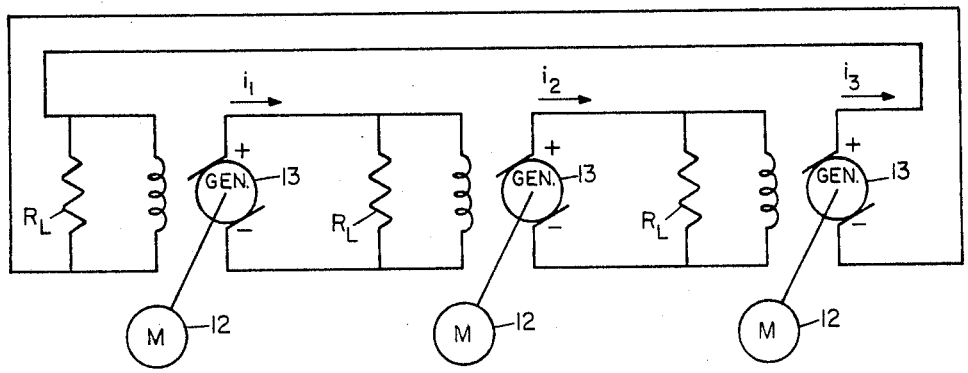
Figure 9:
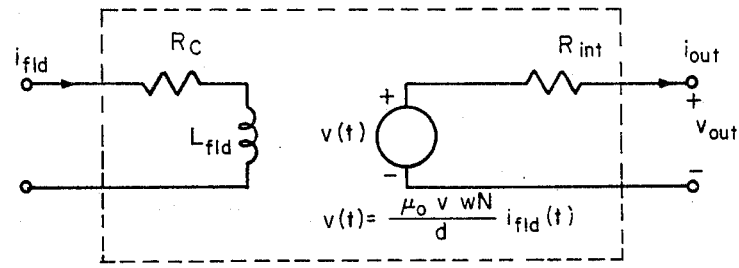
Figure 10:
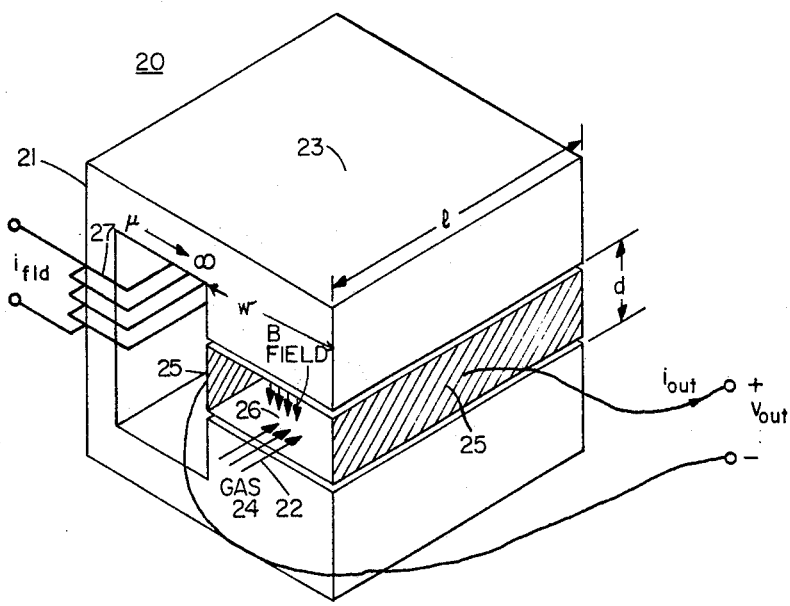
Figure 12:
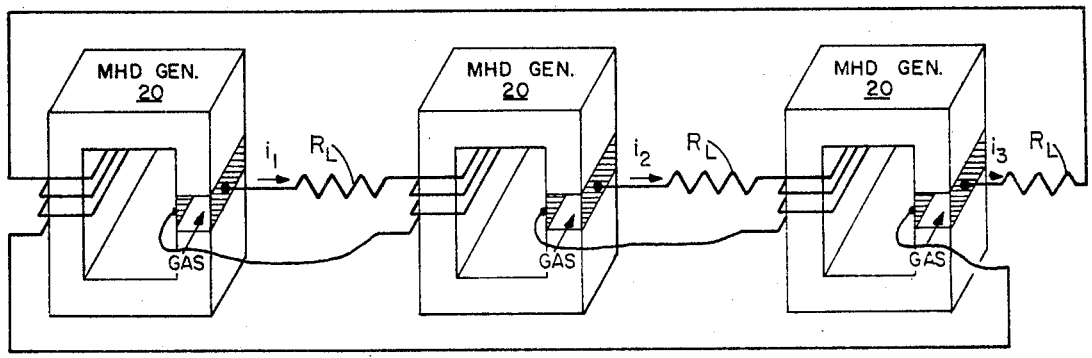
Figure 11:
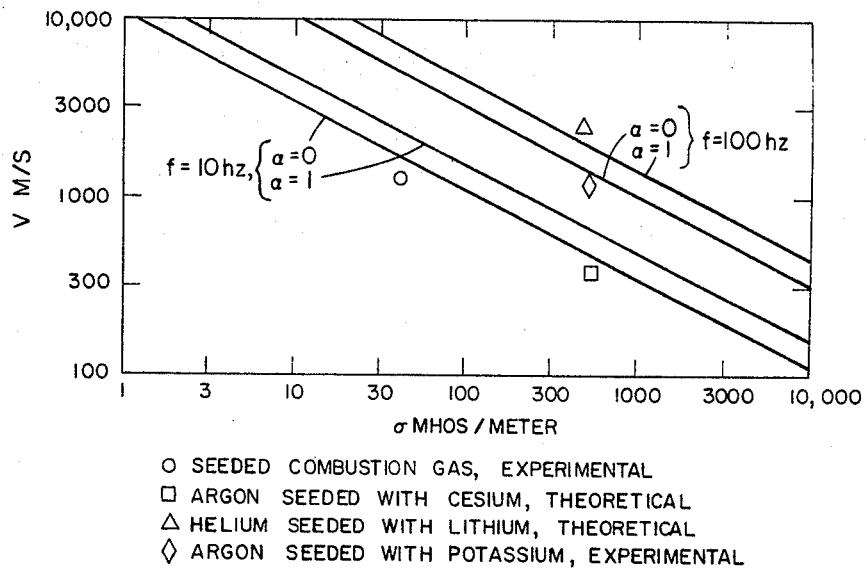
Figure 13:
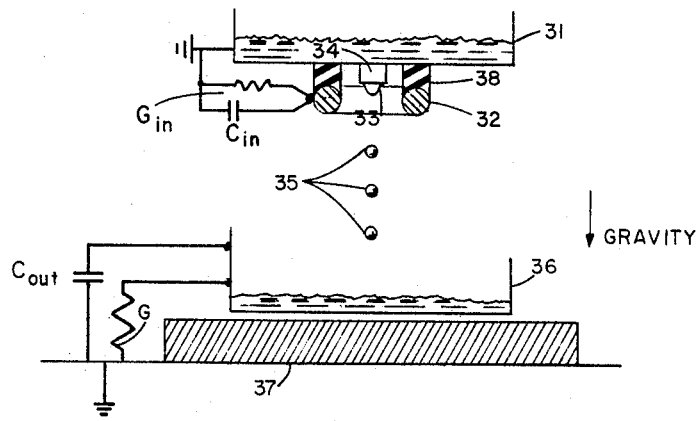
Figure 14:
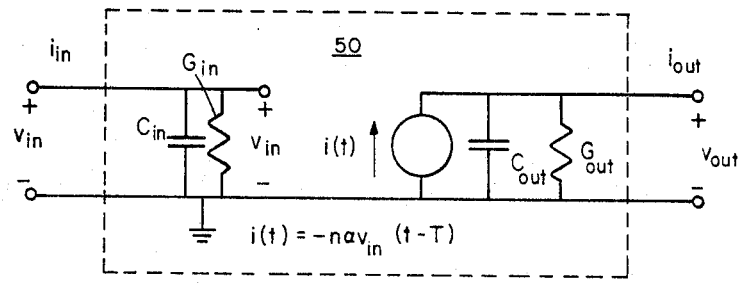

While the invention has thus been generally described a better understanding of the invention is obtained by referring to the accompanying drawings and specification in which:

FIG. 1 is an electrical model of a rotating DC generator;
FIG. 2 is a three-phase AC generator with a three-phase series load;
FIG. 3 is an electrical model of a three-phase AC generator;
FIG. 4 is a four-phase AC generator and a four-phase load;
FIG. 5 is a phasor diagram for the currents of FIG. 4;
FIG. 6 is an electrical model of a shunt-loaded rotating DC generator;
FIG. 7 is a diagram of maximum frequency of a three-phase system of rotating DC generators as a function of power rating of the generator;
FIG. 8 is a three-phase AC generator with a three-phase shunt load;
FIG. 9 is an electrical model of a magnetohydrodynamic (MHD) generator;
FIG. 10 is an isometric view of an MHD generator;
FIG. 11 is a diagram of the frequency of a three-phase AC generator system as a function of gas conductivity and velocity;
FIG. 12 is a three-phase AC generator system of MHD generators with a three-phase load;
FIG. 13 is a cross section of a cylindrical electrostatic generator;
FIG. 14 is a electrical model of an electrostatic generator;
FIG. 15 is a three-phase AC generator interconnection of electrostatic generators;
FIG. 16 is a simple schematic of a Van de Graaff generator;
FIG. 17 is a schematic three-phase AC generator interconnection of Van de Graaff generators;
FIG. 18 is a schematic of a corona spray point;
FIG. 19 is an electrical model of a spray point;

MECHANICALLY ROTATING DC GENERATORS

A model or equivalent circuit of a conventional rotating DC generator is shown in FIG. 1 to consist of a field winding 10 with resistance $R_f$ and inductance $L_f$, and of an armature 11 with resistance $R_a$ and inductance $L_a$ and a Thevenin equivalent voltage source $v(t)=Ki_f(t)$ directly proportional to time-varying field current $i_f(t)$ but opposite in sign or phase.

In order to generate three-phase alternating current with direct current generators, three identical generators 13 are connected to a three-phase load $R_1$ as shown in FIG. 2. The electrical equivalent circuit of FIG. 2 is shown in FIG. 3 where the mechanical drive 12 is omitted and it is assumed that the speed of the DC generators 11 is constant. A self-sustained steady balanced three-phase voltage across the load resistors $R_L$ of FIG. 2 is obtained when the proportionality factor or gain $K=2R$ where $R=R_a+R_f+R_L$. The angular frequency of the voltage is given by $\omega=(\sqrt{3}/2)(K/L)$ where $L=L_a+L_f$. The currents $i_1, i_2, i_3$ also form a balanced three-phase set. An analysis of FIG. 3 will show that for this value of gain K at the frequency $\omega$, the gain through the closed loop is unity and this phase shift is zero degrees. This same condition of unity gain and zero phase shift exists in all the oscillatory loops to be subsequently considered.

In extending this method of generating polyphase power to more than three phases, it is observed that for three-phase generation three generators were cascaded and the output of the last generator was connected to the input of the first generator, forming a ring. The sign of each interconnection is such that a positive input current to any direct current generator causes a negative input to the following generator.

This polarity of interconnection of N generators will provide a balanced N-phase set of load voltages or currents where N is an odd number. It is also possible to reverse the polarity of an even number of interconnections and not affect the magnitude of the proportionality factor K or the frequency generated. However, the currents in the system will no longer form a balanced N phase set, since the output current will be shifted 180° for each generator whose input connections were reversed.

When N is an even number, it is necessary to reverse the polarity of one interconnection (or any odd number) to obtain the desired zero phase shift through the loop. In the case of the four-phase generator (or an N-phase generator when N is even) the phase currents do not form a balanced four-phase set. One manner of connecting a four direct current generator to provide a four-phase generator is shown in FIG. 4 where, in accordance with the above prescription, one of the interconnectons is reversed. A phasor diagram for the resulting currents, $i_1, i_2, i_3,$ and $i_4$, is shown in FIG. 5.

The gain K and frequency $\omega$ for an N phase system (N greater than or equal to three) is given by $\omega=(K/L) \sin(\pi/N)$, and the condition for stable oscillation is $K=R/\cos(\pi/N)$.

A rotating DC generator in the power range of interest, 100—3000 kw., of conventional armature, magnetic field strength and temperature-rise design parameters, when connected serially with the loads $R_L$ as shown in FIGS. 2, 3, and 4, has an inconveniently small number of turns in its field coil, on the order of one turn, because all the armature current flows through the field coil. Therefore, a cascaded connection of generators where the excited generator field winding is in parallel with the load, known as shunt excitation, will be further considered. One phase of such a cascaded connection is shown in FIG. 6.

For the three-phase shunt excited connection of generators shown in FIG. 7, the gain K and frequency $\omega$ are given by $\omega_{shunt}=(\sqrt{3}/2) K/[(R_a/R_L)+1]L$ and $K_{shunt}=2 [[(R_a/R_L)+1] R_f+R_a]$.

It has been assumed in this presentation that when N direct current generators are interconnected to form an N phase unit, that the gain K of each generator can be set exactly to its desired value as given by the equation for K. In theory, the will have sustained sinusoidal oscillator with amplitude determined by initial conditions. From a practical point of view, however, it is apparent that an slight increase in the load or decrease in system gains will cause the magnitude of the output currents to decrease exponentially to zero. Alternately, if $K>R/\cos(\pi/N)$, the size of the system currents will increase indefinitely. The ideal model is too simple to show that field magnets saturate or the mechanical drives for the generators slow down. Therefore, direct current machines for this application, would be designed so that $K>R/\cos(\pi/N)$ so that the magnetic structure would saturate when the system currents reached the desired level. This same effect is used when direct current generators are run in a self-excited mode. The effect of the saturation is to introduce harmonic currents and reduce the average value of K over any cycle until the gain equation is satisfied.

The same type of saturation effect will occur in all the devices that are discussed, but it shall not be mentioned any further.

For generators at the lower end of the power range of interest, i.e., 100 kw., operating at reasonably high efficiency of 95 percent, a frequency of about 200 cycles will be obtained. A lower value of allowable efficiency results in a higher attainable frequency. A plot of maximum frequency vs. power rating is shown in FIG. 7, with efficiency as a parameter, for generators designed in conformity with generally accepted standards of basic thermal and electrical limitations and connected in a three-phase circuit with shunt load as shown in FIG. 8.

MAGNETOHYDRODYNAMIC GENERATORS

The type of MHD generators of interest for use in this invention utilize hot, gas, for example, the hot (3100° K.) combustion gas resulting from burning liquid hydrocarbons or powdered coal with oxygen. To insure suitable electrical conductivity, the gas may be seeded with a potassium or cesium salt. Combustion gas conductivities on the order of 40 mhos/meter have been reported.

A simple lumped electrical parameter model of the MHD generator as seen from its electrical terminals is shown in FIG. 9 for the simple model of the MHD generator 20 of FIG. 10 which consists of a channel with constant cross-sectional dimensions through which conducting gases flow. The gas conductivity is assumed independent of temperature and pressure; the gas is assumed incompressible and inviscid so that the gas velocity will be constant.

A magnetic field structure 21 generates a B field that is transverse to the direction of gas flow 22. In FIG. 10 the magnetic field B is closed by a highly permeable yoke 23. Output currents, $i_{out}$, flow through the moving gas 24, in a direction that is transverse to both the gas velocity 22 and the imposed B field. Currents are collected by electrodes 25 at the edges of the channel 26.

In developing the equivalent circuit of FIG. 9 certain reasonable simplifying assumptions were made. The magnetic fields induced by output current $i_{out}$, were neglected as were the fringing currents, and it was assumed that current density J in the gas is completely directed transverse to the magnetic field B and the gas flow in the direction 22; fringing magnetic fields were neglected and it was assumed that B is in the direction shown. The magnetic Reynolds number, $R_m=\mu_o \sigma v l$, using typical values for gas conductivity $\sigma=10$mho/m, gas velocity $v=1000$ meters/sec, $l=$ channel length $= 1$ meter, permeability $\mu_o=10^{16}$, is $R_m \cong 10^{12}$. Since $R_m<<1$ the velocity of the gas does not significantly distort the magnetic field, B, or the current density, J, from what they would be with no velocity. Therefore, it can be assumed that both B and J are independent of position in the region of the channel.

The equation for the output voltage in terms of $i_{fld}$, $i_{out}$, and the machine parameters, $w=$ width of channel and $d=$ depth of channel in meters is.

$v_{out}=(-\mu_o vwM/d)i_{fld}-R_{int} i_{out}$, where $R_{int}=w/\sigma l d$ is the resistance of a conducting block of gas with the dimensions of the channel and of conductivity $\sigma$.

As in the case of the rotating direct current generator, the model of the MHD generator has isolated input and output circuits. A resistance $R_c$ for the M turn magnet winding 27 was assumed.

Generation of Three-Phase AC with MHD Generators

A comparison of the model of the MHD generator of FIG. 9 to the model of the rotating direct current generator shown in FIG. 1 discloses their similarity. Therefore, the parameters of the rotating generator may be identified in terms of the parameters of the MHD machine, $R_a$ becomes $R_{int}$, $R_f$ becomes $R_c$, $L_f$ becomes $L_{fld}$, $L_a$ becomes 0 (zero), and K becomes $(\mu_o vwM)/d$.

It should be noted that the statements made earlier with respect to connecting rotating DC generators to provide an N phase machine, where N is any odd or even integer greater than two, apply also to MHD generators. However, only the use of MHD machines for generation of three phase alternating currents shall be considered in detail.

From the earlier equations for K and $\omega$ for three-phase rotating DC generators, the condition for stable operation of the MHD three-phase generator is $(\mu_o vwM)/d=2(R_{int}+R_c+R_L)$.

When this condition is satisfied, oscillation is at a frequency $\omega=(\sqrt{3}/2)(\mu_o vwM)/dt_{fld}$.

For reference, the condition for self-excitation of a direct current series excited MHD generator is $\mu_o vwM/d=R_{int}+R_c+qzR_L$.

It is assumed that the total of $R_L+R_c$ is a multiple, $\alpha$, of the internal resistance, $R_{int}$;

$(R_c+R_L)=\alpha R_{int}$.

Using these equations, the number of turns in the field winding and the frequency of oscillation in terms of machine parameters is $M=2(1+\alpha)/\mu_o \sigma l v$ $\omega=(\sqrt{3}/4)(\mu_o \sigma v^2) / (1+\alpha)$. Within the limits of the approximations, the frequency of oscillation depends only on the degree of loading and the $\sigma v_2$ product for the gas.

FIG. 11 shows permissible gas conditions for generator operation at 10 Hz. and 100 Hz. with both zero power out ($\alpha=0$, lossless field windings and generators just supplying their own excitation) and maximum power out ($\alpha=1$). Several points indicating presently attainable or theoretically attainable gas conditions are listed for reference.

It is apparent from inspection of FIG. 11 that presently attainable conditions in seeded combustion gas with equilibrium conductivity are sufficient to generate power at low frequencies. Generation of power at higher more useful frequencies may be possible as indicated by the theoretically attainable conditions listed.

The cost that is paid for using this method of generating alternating current with MHD generators is the cost of building an AC magnetic structure and an AC field coil with twice as many turns as the corresponding DC field coil. In addition, the fact that each generator must supply reactive power to another generator field as well as real poser to the load reduces the kw. output of each generator by 50 percent.

The equations for the three-phase connection of MHD generators and the performance curves of FIG. 11 assumed that the load, $R_L$ was serially connected as shown in FIG. 12. For the $R_m$ value previously calculated, the number of turns M of each generator field winding is approximately 400 turns at maximum output power. Also, although gas properties attainable today limit frequency to about 10 Hz., reasonably attainable gas conditions are sufficient for operation at 60 Hz.

ELECTROSTATIC ENERGY CONVERSION DEVICES

In electrostatic generators, mechanical forces are used to move free charge against an electric field, or to increase its electrical potential energy. Some electrostatic generators are familiar; Wimshurst machines and small Van de Graaff generators are well known. They are low current, high voltage DC devices, and normally generate negligible amounts of power. However, it is not clear that electrostatic generators are necessarily limited to low power applications. Power companies are transmitting power at 750,000 volt levels, and it becomes apparent that electrostatic AC generators could freed these transmission lines directly, without expensive step-up transformers, if high power AC electrostatic generators were available. Research is currently being conducted on DC electrostatic generators to improve their power ratings. Many of the DC devices currently being developed could be used in groups to supply power polyphase AC voltages in a manner similar to that previously described for rotating DC generators.

The analysis of the electrical part of a very simple electrostatic device 30 shown in FIG. 13, one-half of a "Kelvin Water Dropper," results in a lumped parameter model for its electrical characteristics shown in FIG. 14.

FIG. 13 indicates that the device is cylindrical, but its actual shape is unimportant. For the purposes of discussion, water from supply 31 will be considered a perfect conductor. A positive voltage between the excitation ring and ground will provide E field lines starting on the excitation ring 32 and terminating on the water supply and on the drop of water 33 that is forming at the end of the nozzle 34. This means that each drop 35 that forms will have electric charge induced on its surface, a charge that will exist at the time that the drop breaks away from the nozzle. Each drop 35 will therefore carry a net charge. The charge will be proportional to the negative of the voltage of the excitation ring 32 at the time that the drop breaks away from the nozzle, assuming that there are no other significant E fields near the drop. The constant of proportionality is $\alpha$, ($\alpha>0$).

The drops fall under force of gravity to a collecting pan 36 below the nozzle. This pan has some capacitance with respect to ground, say $C_{out}$, and there will be output conductance, $G_{out}$, connected to ground from this collecting pan because of insulating block 37.

It is assumed that all the drops that break away from the nozzle reach the collecting pan some time T after they break away. Then, if there are $n$ drops per second coming from the nozzle, and a voltage $v_{in}$ on the excitation ring, there will effectively be a current source $i(t)=n\alpha v_{in}(t-T)$ taking current from ground to the collecting pan.

The effective capacitance of the excitation ring 32 to ground is time varying due to the drops breaking away from the nozzle. However, the effect is ignored and an average capacitance, $C_{in}$, is assigned to the excitation section. The insulating support 38 for excitation ring 32 results in an input conductance $G_{in}$ between ring 32 and ground.

With these definitions and assumptions the electrical Model 50 for the "dropper" becomes that of FIG. 14. It is assumed that characteristic times for electrical transients in any EGD generator including the "dropper" are long compared to the delay time T, thus allowing the existence of T to be ignored.

In order to provide a three-phase AC generator, three identical "droppers" are cascaded with the output of the third unit connected to the input of the first unit as shown schematically in FIG. 15.

Comparison of the Kelvin dropper interconnected for three-phase operation as shown in FIG. 15 with the three-phase connection of rotating DC generators of FIG. 3 reveals that these circuits are duals. Therefore, allowing R to become $G_1$, L to become C and K to become $K_e$ in the equations for gain K and frequency $\omega$ of the three-phase rotating DC generator configuration, the node voltages of the three interconnected "droppers" of FIG. 15 will oscillate at a frequency $$w=(\sqrt{3}/2)(K_e/C)$$

if $$K_e=2G$$

where $C=C_{in}+C_{out}$, $G=G_{in}+G_{out}+G_L$ and $K_e=i(t)/v_{in}(t)$. The node voltages form a balanced three-phase set on loads $G_L$.

The models are structurally duals of each other, except that the magnetic machine is inherently a four-terminal device while the "dropper" has one of the input terminals inherently connected to one of the output terminals.

It is this three-terminal device that limits the number of the "dropper." As shown in FIG. 15, all of the individual "dropper" connections are common because there is only one water supply. There is no option in choosing how to cascade successive "droppers" when they are connected in a loop. Each "dropper" must be connected to the following unit such that a positive output of the first unit causes the output of the following unit to decrease. This means that if a single water supply is used power with an odd number of phases only can be generated.

Of course, if separate, electrically isolated, water supplies were used for each unit, the option is allowed of cascading the "dropper" such that a positive output for the first unit causes the output (water supply) of the following unit to increase in potential. Therefore, we can generate an even number of phases if desired.

Qualitatively, the effect of the finite time delay T is a reduction in the frequency of oscillation and a decrease in the gain necessary for steady state oscillations. The time delay T produces a phase lag between the output current $i(t)$ with respect to the excitation voltage $v_{in}$ but otherwise does not cause any basic operational change.

Other Electrostatic Devices

In the Kelvin water dropper, it is gravity that overcomes the electrostatic repulsion and drives the charged water droplets from the nozzle to the collecting pan. Many other possible methods of mechanically driving the charge to the high voltage electrode are available. The charged droplets could be sprayed from a nozzle, giving them some kinetic energy which they would lose on their way to the electrode, or the droplets could be entrained in a jet of air which would push them to the electrode. The charge could be put on specks of dust and blown; ions could be introduced in a liquid and the liquid could carry the charge; the charge could be put on the surface of a solid carrier and the solid carrier moved to the high voltage electrode.

This last method, in which a solid carrier is used, is the method used in the Van de Graaff generator 45 of FIG. 16. Van de Graaff generators employ a moving insulating belt 40 to move charge from a supply 44 to a point 41 where it is "sprayed" onto the belt 40 to a high voltage terminal 42. Van de Graaff generators normally have an output voltage on the order of 1—10 million volts and an output current on the order of one-half to 1 milliampere. The charge is placed on the belt 40 in a region of high electric field by a corona discharge; the maximum charge density on the belt is limited by the electric field breakdown strength of the insulating medium next to the belt. Roughly speaking, the normal electric field from the charge on the belt is the electric field that would exist from an infinite sheet of charge with the same charge density. In practical generators, charge densities of about half this maximum value are normally achieved. The belt is driven at a speed of about 6000 ft./min., and additional spray points in the high voltage electrode are used to allow utilization of the downward belt run. The two runs of a belt in atmospheric air (breakdown strength $3\times10^6$ volts/meter) traveling at 6000 ft./min. can deliver about 0.5 milliamperes.

Three Van de Graaff generators could be connected together as shown in FIG. 17 to provide a three-phase source. Spherical electrodes are used on the generators to limit electric fields, so we would not, in practice, want to connect wires to the electrodes. Also, the corona charging effect is grossly nonlinear, so if the system were operated, the output voltage would contain a significant amount of harmonics.

Van de Graaff generators are current limited devices, and present-day Van de Graaff generators will not operate at 60 Hz. with their normally high output voltages. The capacitance of the high voltage electrode stores too much energy. We can see this if we assume that the belt will carry 1 milliampere. Assuming no conductive load, $i=C(dv/dt)$. C is on the order of magnitude of 100 $\mu\mu f$., so that $(dv/dt) \approx 10^{13} \times 10^{10} = 10^7$ volts/second. A generator of this sort with a triangular output waveform of 2 megavolts peak-to-peak could operate at only 5 Hz. Of course, if the output voltage magnitude were reduced to 200,000 volts, peak-to-peak, the generator could operate at 50 Hz.

From an energy conversion point of view, Van de Graaff generators are relatively inefficient, and in their present state could not be seriously considered for high power applications. However, other electrostatic devices are being developed for which their developers project relatively high power conversion densities, for example, a megavolt machine with conversion densities of $3\times10^7$ watts/meter. These proposed devices use a moving fluid to transport charge to a high voltage electrode. Most of the devices that are reported use a corona effect to put the charge on the drops or the dust that is being used.

The corona spray point is different from the excitation ring that was used for the "Kelvin dropper," but it is equivalent to the excitation section. The single spray point is shown in FIG. 18. The input signal is applied to a plate 51, with the actual spray point 52 grounded. The corona causes ionization of the air in the immediate vicinity of spray point, and we shall assume that the ions move with the air so that very few of them reach the plate. Very little current then flows through the voltage source; the source mainly supplies energy to establish the field that causes the ionization. To the source, then, the spray point looks capacitive, or if we allow some of the ions to each the plate, the spray point looks like a capacitance and conductance in parallel. This is shown in FIG. 19. In large devices the point is replaced by a grid of points called a corona screen. Its model will be the same as for the spray point.

From the point of view of producing ions, the analysis of the spray point is extremely complicated and not well understood. Although for any given geometry the rate of ion production is not linear with applied voltage, it shall be assumed that the effect is linear.

If it is assumed that the ion rate is linear with applied voltage and the model of FIG. 19 is considered, it is seen that the model of the corona excitation section is equivalent to the model of the excitation section for the "Kelvin water dropper."

These fluid devices will not be examined in detail; they differ from the "water dropper" in the mechanical means used to move charge against the electric field. It is desired that the ratio ($K_e/C$) be as high as possible in order to generate high frequencies. However, $K_e$ depends on C, for one of the terms in C is $C_{in}$. For the "dropper," minimal spacing between the excitation ring and forming drop is desired in order to get a high electric field and correspondingly high induced surface charge. However, the small spacing means a relatively large $C_{in}$.

The gravity-powered "water dropper" is a very low frequency device, more sophisticated methods of generating charged droplets indicates that 60 Hz. operation is not totally unreasonable. A nozzle that utilizes compressed air to generate an aerosol mist that is charged inductively is reported to have a value of $K_e=0.0085$ $\mu a$./volt, with a capacitance of 7.0 $\mu\mu f$. Assuming that this is the dominant capacitance of the unit, we see from the equation for frequency that $\omega \approx 1000$ or $f=165$ Hz.

Balanced loads on each phase and identical DC generators have been considered in the preceding presentation and resulted in balanced currents and voltages and, at least for odd number of phases, a balanced phasing of these voltages. Deviations of the load or generators from balance produce asymmetrical systems but there is no fundamental difference from the mode of operation presented for balanced systems.

While there have been shown and described the fundamental novel features of the invention as applied to preferred embodiments, it will be understood that various omissions, substitutions, and changes in the forms and details of the devices illustrated and its operation may be made by those skilled in the art without departing from the spirit of the invention.

I claim:

1. An N-phase alternating current electrical generator comprising
   N direct current electromechanical generators for providing high electrical power to a load,
   each generator having input terminals and output terminals,
   the input terminals of one generator being connected to said electrical load and to the output terminals of a different generator to form a cascaded connection of the N generators in a closed loop,
   the generators each having an input impedance, an output impedance and an electrical transfer characteristic,
   the phase shift produced by current flow through said input and output impedance and said load measured between two adjacent corresponding points of the closed loop being 360/N degrees,
   the electrical transfer characteristics being such that the ratio of the amplitudes of electrical quantities at these same points is 1/N,
   the gain of each generator being sufficient to produce unity voltage gain through said loop by the cascaded N generators at a frequency for which the phase shift through the loop is zero,
   the voltages at corresponding points in the loop constituting an N-phase system of voltages.

2. The AC generator of claim 1 comprising in addition
   N electrical loads,
   one of said N loads being connected across the output terminals of each of said N generators.

3. The generator of claim 1 comprising in addition
   N electrical loads,
   each of said N loads being connected serially between the output terminal of one generator and the input terminal of a different generator.

4. The alternating current generator of claim 1 wherein each direct current generator is a mechanically rotating type of generator having input terminals connected to a field winding having an input impedance and output terminals connected to an armature having an output impedance, and an electrical transfer characteristic such that the voltage generated in the armature is sufficient to produce a current in the field winding to which it is connected such that the cascaded generators provide unity voltage gain through the loop at the frequency for which the phase shift through the loop is zero.

5. The generator of claim 4 wherein said load resistance is connected across the terminals of each armature.

6. The alternating current generator of claim 1 wherein each direct current generator comprises a magnetohydrodynamic direct current generator comprising a magnetic field winding with a pair of input terminals having an input impedance and a pair of output terminals having an output impedance connected to electrodes in contact with electrically conductive high velocity gas, the transfer characteristic of said generator being such that the voltage generated across said electrodes is sufficient to produce a current in the field winding to which it is connected such that there is unity voltage gain through the loop at the frequency for which the phase shift through the loop is zero.

7. The generator of claim 6 comprising in addition a load resistance serially connected between the electrode terminal of one generator and the field winding terminal of a different generator in said loop.

8. The alternating current generator of claim 1 wherein each direct current generator comprises an electrostatic generator having a pair of input terminals having an input impedance and a pair of output terminals having an output impedance, said electrostatic generator having a transfer characteristic whose electrical representation is that of a current generator whose output current is proportional to its input voltage, a load conductance connected across the terminals of each generator output, the output current of each generator produces a voltage across each load conductance, the ratio of this output voltage to the input voltage being 1/N with a phase shift of 360/N degrees, the output current of each generator with respect to its input voltage being sufficiently large that there is unity gain through the loop at the frequency for which the phase shift through the loop is zero.